Patented Oct. 3, 1950

2,524,045

UNITED STATES PATENT OFFICE 2,524,045

MULTICHAIN POLYAMIDE RESINS

Paul J. Flory, Kent, Ohio, assignor to Wingfoot Corporation, Akron, Ohio, a corporation of Delaware No Drawing. Application June 5, 1946, Serial No. 674,655

14 Claims. (Cl. 260—78)

This invention relates to a new type of condensation polymer which is non-linear, but which is capable of being drawn into fibers, molded, or otherwise formed. More particularly, the invention relates to polyamides made by condensing amino acids, or derivatives thereof, with polymeric polycarboxylic acids, or derivatives thereof.

Condensation polymers, both the polyesters and polyamides, have been known to the art for many years. More recently the field has been systematically investigated and developed by W. H. Carothers and his co-workers and many patents have issued to them. Much of this work has been published in various patent specifications, and in "Collected Papers of W. H. Carothers," Interscience Publishers Inc., New York (1940). The prior art recognizes a critical distinction between two types of condensation polymers. When the compounds being condensed are bifunctional, that is, when each of the condensing molecules has only two reactive groups, the condensation must be linear. Thus, a monoamino-monocarboxylic acid can only condense to form polymers of the general type:

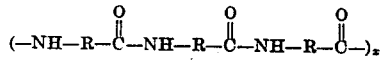

Similarly diamines and dicarboxylic acids can only form linear polymers of the general type:

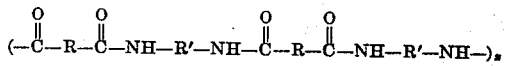

It has long been recognized that the introduction of polyfunctional units having three or more functions causes the formation of a network structure and the polymer will gel and lose its desirable thermoplastic properties. Such non-linear polymers are generally insoluble and infusible, apparently owing to the network structures which occur. The linear polymers are thermoplastic because the long linear chains are not interlocked by branched linkages. Similarly, it is well known that variation can be brought about by the incorporation of a polyfunctional reactant having more than two reactive groups with a mixture of other reactants which normally produce thermoplastic linear polymers. The replacement of a remarkably small percentage of one or the other of the bifunctional reactants by said polyfunctional reactant is known to cause the formation of thermoset or gelled products in place of the thermoplastic polymers which would otherwise be formed. For example, even one-half mole percent of a reactive tetrabasic acid when added to an equimolar mixture of dicamethylene diamine and sebacic acid induces gelation during the polymerization. The product which otherwise would have been thermoplastic is thermoset and unsuitable for extrusion molding, solution casting and any other conventional plastic fabrication method. Usually such gelation takes place before a desirable molecular weight is achieved and the compound so obtained is not capable of conventional usage.

Similarly, the use of other polyfunctional compounds having more than two reactive groups will form gelled thermoset polymers. The polymers formed similarly from triamino compounds, trihydroxy compounds and the other amino and hydroxy compounds having more than three functions are also non-thermoplastic and not capable of being used in the manner described by the art for linear polymer fabrication.

The prior art, as exemplified by Carothers' work, relates entirely to the linear type of condensation polymer. This is unequivocally stated in the basic patents issued to Carothers (U. S. 2,071,250 and U. S. 2,071,251). These patents further teach that only bifunctional compounds can be used to prepare linear polymers and that the use of polyfunctional compounds having more than two reactive groups will produce undesirable polymers.

Despite this teaching of the prior art, it has now been found possible to synthesize entirely new non-linear polymers which are thermoplastic and capable of being formed into strong useful fibers.

A further purpose of this invention is to provide a method of preparing thermoplastic macromolecular polymers wherein by proper selection and proportioning of reagents the formation of gelled or non-thermoplastic polymers is avoided. Still further purposes of this invention are to provide simple and convenient methods of preparing new and valuable condensation polymers.

In accordance with this invention it has been found that polyamides of non-linear character may be prepared which are useful in the preparation of fibers and in various molding and forming operations, contrary to the expectations and teachings of the prior art. The new polyamides are prepared from polymeric polybasic acids or derivatives thereof, such as esters, amides, acid chlorides, or anhydrides, by condensation with amino acids having only one of each amino and carboxylic acid groups, or derivatives of the same amino acids, such as esters, amides or lactams. The new polymers, though decidedly non-linear in character, are nevertheless devoid of a network structure. They may be represented by the formula:

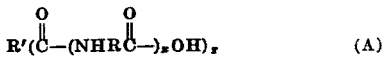

wherein R' is the radical, or nucleus, of the polymeric polybasic acid to which the carboxyl radicals are attached, R is the radical of the amino acid, $x$ represents the average number of amino acid groups in the condensed chains, and $y$ represents the average number of chains per R' nucleus.

The above structural Formula A will apply when the carboxyl groups in the nucleus R' are spaced relatively distant from each other, that is, when the carboxyl groups are attached to carbon atoms which are separated in a chain by two or more other atoms. If the carboxyl groups are attached to adjacent carbon atoms or to carbon atoms separated by only one other atom, a side chain may be attached to the nucleus by an imide linkage such as

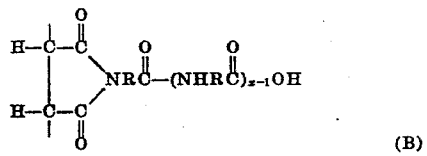

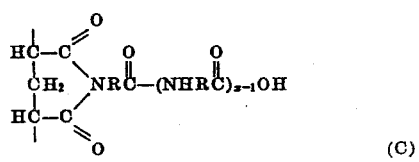

The imide linkages as shown by the structural Formulae B and C will probably be found in all polyamide condensation polymers where the carboxyl groups are spaced relatively close together in the polymeric acid although amide linkages, such as shown in Formula A, may also be present.

The new amide condensation polymers may be regarded as branched chain polymers in which long polyamide polymer chains extend from a polymeric nucleus. For example, the condensation polymer of polyacrylic acid, and an amino acid may be represented by the structural formula

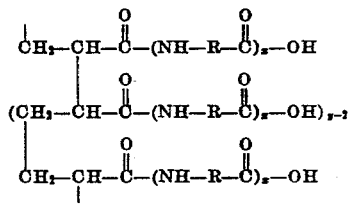

wherein $y$ is the average number of carboxylic groups in the polyacrylic acid, and $x$ is the average number of amino acid molecules condensed in the side chain.

The new condensation polymers are macromolecular multi-chain structures in which the average number of carboxylic acid groups in the nucleus may vary from 10 to 500 and preferably will be from 25 to 200. The number of amino acid molecules condensed in the side chains will average between 10 and 1000 and will preferably be between 20 and 100.

Although the number of chains will always be determined by the number of carboxylic groups in the polycarboxylic acid or derivative thereof, the length of the chains will be determined by the proportion of reagents. Generally between 300 and 30,000 molecules of amino acid or derivatives thereof are reacted for each molecule of polycarboxylic acid or derivative thereof, but preferably this ratio will be between 500 and 20,000.

Useful polymeric carboxylic acids and derivatives thereof may be prepared by polymerizing unsaturated acids or their esters, amides, acid chlorides and acid anhydrides. The same compounds may be prepared by polymerizing nitriles and subsequently converting the polymeric nitrile to a polymeric acid, ester, amide or acid chloride form. Such polymeric acids include polyacrylic acid, polymethacrylic acid, other alpha-alkyl-substituted acrylic acids, polyvinyl benzoic acid and copolymers of said acids with unsaturated hydrocarbons such as styrene or with vinyl ethers. The copolymeric type of acids usually have a greater average spacing of the carboxylic acid groups. Other polymeric acids and esters suitable for use in the practice of this invention are copolymers of maleic anhydride, alkyl maleates, such as ethyl maleate, alkyl fumarates, such as ethyl fumarate, with polymerizable hydrocarbons, such as styrene, isobutylene and stilbene. In general, any heat stable polymer which contains carboxylic acid groups or other substituents which react to form carboxylic acid groups under the conditions of the reaction may be used in the preparation of the multichain polyamides. The polymeric acids are mixtures of acids varying in number of carboxylic acid groups by reason of the variation in degree of polymerization. Such mixtures of polymeric acids are defined in terms of average molecular weight or average number of carboxylic groups per molecule. The polymeric carboxylic acids are especially useful because they can be polymerized to any desired extent depending upon the number of carboxylic groups desired in the poly acid. Compositions having a desired average molecular weight and a desired average number of carboxylic acid groups may be reproduced at will. The molecular weights of the polymers will generally exceed 10,000 and preferably will be in excess of 40,000.

Accordingly, by the proper selection of a polymeric acid, a multi-chain polyamide having any desired average number of side chains per molecule can be formed.

In the preparation of the multi-chain polyamides the polymeric polycarboxylic acids or derivatives thereof are condensed with mono-amino-monocarboxylic acids or the corresponding esters, amides or lactams. Suitable preferred amino acids are 6-aminocaproic acid, 10-aminodecanoic acid, 9-aminostearic acid, 12-aminostearic acid, 13-aminobehenic acid, 9-aminomargaric acid, 14-aminobehenic acid, 9-aminopalmitic acid, 13-aminostearic acid, 2-methyl-epsilon-caprolactam, p-(2-aminoethyl)benzoic acid and other known monocarboxylic acids having a single amino function.

Any amino acid which condenses predominantly intermolecularly, rather than intramolecularly, may be used. In other words, the amino acid should have more than four carbon or other atoms separating the $NH_2$ and $COOH$ groups in order to avoid intramolecular condensation or cyclization.

It will be noticed that the number of chains per molecule and the number of amino-acid groups per chain may be varied from relatively small numbers to very large values. Generally where the number of chains present is relatively small the chains are preferably of greater length, and where the chain length is quite short the preferred compounds will have a relatively large number of the side chains. Similarly, useful polyamides may be prepared with a moderate number of chains of intermediate length. Short chain polyamides and those having few chains may be of too low a molecular weight to be useful in drawing fibers. Such compositions may be useful as coating compositions or adhesives or in the preparation of molded objects. The higher molecular weight compositions frequently are crystalline in nature and can be drawn into strong elastic fibers. They are also useful in the preparation of coating compositions and in the molded products field. In general, the polyamides condensed from a single amino acid, or derivative thereof, are more useful in the preparation of fiber-forming polyamides capable of being cold-drawn, while the polymers of a plurality of different amino acids, or derivatives thereof, are particularly valuable as coating compositions and in the fabrication of molded products.

The new multi-chain polyamides generally are prepared by heating an amino acid of the type above described, or any suitable derivative thereof, with a polymeric carboxylic acid, or derivative thereof, at temperatures above the melting point of the mixture. In some cases where a diluent is used, the temperature may be below the melting point of the reactants or the resulting polyamide but above the melting point of the reaction mass including the diluent. Temperatures between 150° C. and 275° C. are usually required to produce a desirable polymer. In the preparation of multi-chain condensation polymers, it is customary to carry the condensation reaction as nearly to completion as is practicable. In many cases, it is desirable to employ a lower temperature initially, such that the reaction proceeds at a moderate rate, the temperature being raised at a later stage to facilitate substantial completion of the condensation. In some instances, the temperature may be gradually increased throughout the reaction, or increased intermittently so as to operate at three or more different temperatures. The condensation reaction usually is completed at temperatures in the vicinity of 250° C. In some cases, as for example where the melting point is unusually high, it may be necessary to operate at higher temperatures in order to maintain the polymerizing mixture in a molten condition. If the melting temperature of the reaction mass approaches the decomposition temperature of the polyamide, usually in the vicinity of 300° C., it is frequently desirable to reduce the melting point by employing an inert diluent such as a high boiling phenolic compound.

At the higher temperatures employed, for example over 200° C., the polymerizing mixture is susceptible to oxidation by air, or even traces of oxygen. Oxidation causes a darkening and degradation of the polymer. Accordingly, it is important to exclude oxygen from the reaction. This is accomplished by sweeping out the reaction vessel with nitrogen, or other inert gas, prior to the initiation of the reaction and maintaining the oxygen-free atmosphere by passing a continuous stream of the inert gas through the reaction chamber during the polymerization. The stream of inert gas further assists in removing traces of water vapor, alcohols, or other by-products formed by the reaction, depending upon the particular derivatives selected for the preparation. Although any inert gas, such as helium and argon, may be used, for reasons of economy nitrogen is preferred. Ordinarily commercial nitrogen, however, is not useful because it contains traces of oxygen which interfere with normal operations. Accordingly, it is necessary to purify the nitrogen by the removal of all traces of oxygen.

The progress of the polymerization can be conveniently followed by periodically determining the viscosity of the molten mass in situ, and at the temperature of polymerization. As already mentioned, it is desirable to carry the reaction as nearly to completion as possible. Accordingly, further heating is discontinued when the condensation has reached substantial completion as judged by the tendency of the melt viscosity to approach an asymptotic upper limit, that is, when successive viscosity measurements, separated by an interval of 15 minutes to an hour, show no large increase in viscosity.

Usually, but depending somewhat upon the nature of the particular reactants, it is preferred to subject the hot reaction mixture to a reduced pressure during a portion, usually the later stages, of the polymerization. In this manner, low molecular weight volatile by-products of the condensation, as well as unreacted monomers such as the lactams, may be largely removed. Pressures between 10 and 100 mm. of mercury are preferred for this purpose. A stream of inert gas, such as oxygen-free nitrogen, may be passed through the reaction mass while it is under reduced pressure to facilitate the removal of volatile materials. The completed polymers may be drawn into filaments immediately or they may be cooled and ground to convenient size for storage. The molten polymer may be cooled by quenching in water and the resultant product ground to the desired size and dried.

The specific polymerization procedure employed will be governed largely by the particular reactants in a given case. A few further generalizations may be mentioned. If an amino acid or its ester or amide is to be polymerized with the polybasic acid, the reactants may be heated together at atmospheric pressure, in the absence of oxygen, under conditions permitting removal of the by-product, such as water, alcohol, or ammonia. If, on the other hand, a lactam of the amino acid is to be employed, it may be necessary to subject the reactants to a preliminary heating above their melting points, and usually in the neighborhood of 180 to 225° C. in a closed system. In such cases it is customary to add a small proportion of water to the ingredients for the purpose of assuring intermolecular reaction of the lactam. After the preliminary heating period, usually for 2 to 24 hours, the lactam ring is opened and the polymerization is completed at atmospheric or lower pressures as described above. Alternatively, the pressure developed by the water may be released gradually by bleeding off the water slowly. Similarly, if a nitrile or an ester of the polymeric polybasic acid is employed, rather than the acid itself, it is preferred to conduct the initial phase of the polymerization in a closed system under the pressure of water which is added initially or which may be formed by condensation.

In the preparation of high molecular weight polyamides it is frequently desirable to reduce the viscosity of the polymers during the condensation reaction by adding plasticizers. These plasticizers are high boiling compounds which are liquids at the condensation temperatures and solvents for the polyamides. Such compounds reduce the viscosity of the polymers and permit the use of higher temperatures than would otherwise be possible. Accordingly, by adding the plasticizers, higher molecular weights are reached and polyamides useful in fiber drawing are prepared, which otherwise would not be capable of such use. Suitable plasticizers are p-hydroxydiphenyl, xylenol, and o-hydroxydiphenyl.

The new multichain polymers may be drawn into filaments by extruding the molten polymer through dies or orifices of suitable size, whereby continuous fibers are produced by the congealing of the polymers. Similar filaments may be prepared by the preparation of solutions of the polymer in any suitable solvent such as an alcohol, a phenol, a glycol, a chlorhydrin, formic acid or sulfuric acid, and extruding the solution through a die into a heated drying atmosphere or into a liquid which is miscible with the solvent but a non-solvent for the polymer. The latter wet processes for spinning produce filaments similar to the melt extrusion methods. By variation in the size and shape of the orifices, rods, sheets and other shaped polymers can be prepared. The polymers may be molded and otherwise shaped under heat and/or pressure. For example, the polymer may be rolled into thin sheets useful as wrapping material. Irregular shapes may be cast or pressed in suitable molds.

A principal property of the new polymers is their capacity for improved tensile strength achieved by cold drawing. If the fibers are elongated 100 to 500 percent at temperatures below their melting points, substantial improvement in tensile strength will be effected. Thin sheets may similarly be strengthened. The cold drawn fibers may be spun into thread or yarn of exceptional strength and woven into useful fabrics. Larger fibers may be used individually in the fabrication of brushes.

It should be understood that the new polyamides can be varied extensively in molecular structure, both by the selection of a polymeric carboxylic compound having the desired average number of carboxylic groups, and by the proportioning of the amino acid with respect to the polymeric carboxylic compound. By this means, the average length of the numerous branch chains is controlled.

Further details of the preparation of the new polyamides are set forth with respect to the following specific examples.

Example 1

A mixture of 55.81 parts by weight of epsilon-caprolactam, 1.76 parts of water and 0.5585 part of polymethyl acrylate were placed in a glass reaction vessel. The polymethyl acrylate used in this preparation had a molecular weight corresponding to an average of about 30 methyl ester groups per molecule. All of the air was flushed out of the vessel with a stream of pure argon and then the flask was filled with argon and sealed. The vessel and its contents were then immersed in an oil bath and heated for 20 hours at 197° C. The sealed vessel was then opened and vented through a two-way valve so that either atmospheric pressure or a vacuum could be provided at the vent. A water-cooled condenser was provided in the vacuum line for removing vaporized substances from the fixed gases. A tube-type viscosimeter was introduced into the reaction vessel for the purpose of measuring the viscosity periodically during the subsequent reaction. The tube of the viscosimeter was also used as a conduit for supplying a stream of argon to the flask for the purpose of sweeping out the reaction by-products and the unreacted caprolactam. The polymer was melted and the lower end of the viscosimeter tube was immersed in the molten polymer. While bubbling a slow stream of argon through the polymer, the temperature was raised to 255° C. and maintained thereat for two hours. A vacuum of between 20 and 40 mm. was then applied and maintained for 30 minutes. The viscosity was then measured at the reaction temperature. The heating was continued at atmospheric pressure for 4½ hours longer, during which time the vacuum was applied for 15 minute intervals followed by a measurement of viscosity. After a total of 7 hours at the reaction temperature of 255° C., the viscosity became approximately constant at about 9000 poises; the heating was discontinued. The polymer was a hard, tough, slightly yellowish solid yielding fibers which were readily cold drawn. Part of this polymer was plasticized with 10 per cent by weight of p-hydroxydiphenyl. The viscosity was thereby reduced to 2520 poises. Excellent fibers were drawn from this plasticized polymer. Another portion of the unplasticized polymer was plasticized with 20 per cent of p-hydroxydiphenyl to obtain a mass having a viscosity of only 767 poises. This low viscosity mass also produced high-strength fibers.

Example 2

Using the procedure and the apparatus described in the preceding example, except that a polymethyl acrylate having a molecular weight corresponding to about 465 methyl ester groups per molecule was substituted, 0.189 part by weight of the polyacrylate, 30 parts of epsilon-caprolactam, and 0.96 part of water were reacted. The temperature was maintained for 44 hours at 197° C. for the purpose of opening the lactam ring. After cooling the reaction mass, it was reheated in an atmosphere of argon for 7½ hours at 255° C. while maintaining the pressures alternately at 1 atmosphere and 35 mm. The reaction was interrupted when a constant viscosity of 20,000 poises had been reached. The polymer was a hard, tough, pliable ivory-colored solid readily capable of being cold drawn.

Example 3

Multi-chain polymers were prepared by means of the method and apparatus described in Example 1 by reacting 0.224 part by weight of a polyacrylic acid having molecular weight corresponding to about 350 acid radicals per molecule, 3.36 grams of epsilon-caprolactam, 0.40 gram of water and 0.88 gram of p-hydroxydiphenyl. The reactants were heated in an inert atmosphere for two hours at 184° C. and finally for one hour and 10 minutes at 202° C. The reaction vessel was then vented and, while passing a slow stream of argon through the reaction mass, the temperature was increased to about 255° C. and maintained for 2½ hours. A vacuum of about 35 mm. was then applied while continuing the stream of argon and maintaining the reaction temperature. During this period of evacuation, most of the unreacted caprolactam and the plasticizer were removed. The polymer was a brown, tough solid which formed fibers capable of being cold drawn.

Example 4

A polyacrylic acid having molecular weight corresponding to an average of about 35 carboxylic groups per molecule was also used to prepare multi-chain polymers. Using the apparatus and procedure described in Example 1, a mixture of 0.954 part by weight of the polyacrylic acid, 25 parts of epsilon-caprolactam, 0.80 part of water, and 0.52 part of p-hydroxydiphenyl was heated in an argon atmosphere for 20 hours at 185° C. The mixture was heated thereafter at 255° C. for 7¼ hours while bubbling argon through the reaction mass. The viscosity, determined in the manner described in Example 1, rose to a maximum of 104 poises. During the period of heating, the mass was subjected to a vacuum periodically and 0.38 part by weight of the caprolactam and plasticizer was thereby removed. The polymer was a hard, tan solid that could be spun into fibers which attained high strength after cold drawing.

*Example 5*

A multi-chain polymer was prepared from a polyacrylic acid having a molecular weight corresponding to an average of about 80 carboxylic acid radicals per molecule by a method and apparatus similar to that described in Example 1. A mixture of 0.159 part by weight of the polyacrylic acid, 25 parts of epsilon-caprolactam, 0.80 part of water, and 5.02 parts (20 per cent by weight) of p-hydroxydiphenyl was heated in argon atmosphere for 20 hours at 185° C. The temperature was then raised to 255° C. while passing a stream of argon through the molten reactants. The temperature was maintained at 255° C. for 6¾ hours during which a vacuum of 35 mm. was applied periodically. During the heating, the melt viscosity rose to a maximum of 543 poises. The periodic evacuation removed 0.36 part by weight of combined plasticizer and epsilon-caprolactam which were condensed in a cold condenser in the vacuum line. The polymer was a hard, tough solid capable of being spun into fibers which was drawn to yield strong pliable fibers.

*Example 6*

Multi-chain polymers were prepared by using as the polymeric acid a copolymer of 79.1% by weight of styrene and 20.9% by weight of acrylic acid, said copolymer having a molecular weight corresponding to approximately 70 carboxylic acid radicals per molecule. A mixture of 0.763 part by weight of the copolymer, 25 parts of epsilon-caprolactam, 0.80 part of water and 5.15 parts of p-hydroxydiphenyl was heated at 185° C. for 20 hours. Using the procedure described in Example 1, the reaction mass was heated at 255° C. for 7 hours while periodically applying a vacuum for the removal of the unreacted reagents. A maximum melt viscosity of 1000 poises was reached. The combined plasticizer and caprolactam removed during the evacuation was 0.58 part by weight. The polymer was a slightly tan hard solid which could be spun into fibers capable of being cold drawn to yield strong elastic fibers.

*Example 7*

A copolymer of 89.6 percent styrene and 10.4 percent of acrylic acid having a molecular weight corresponding to approximately 70 carboxylic acid groups per molecule was used to prepare a multi-chain polyamide. A mixture of 1.535 parts by weight of the copolymer, 0.80 part of water, 25 parts of epsilon-caprolactam, and 5.31 parts of p-hydroxydiphenyl was placed in a reaction flask of the type described in Example 1. The reaction was conducted first in an enclosed container with an argon atmosphere at a temperature of 125° C. until a homogeneous liquid solution was obtained. The temperature was then raised to 185° C. and maintained for 20 hours, a clear amber viscous liquid being formed. The polymer was then heated to 255° C. while passing a stream of inert gas through the reaction mass for a period of 7½ hours. During the heating period, the melt viscosity reached a maximum of 1020 poises and 0.48 part by weight of the caprolactam and the plasticizer was removed and condensed in a cold trap in the vacuum line. The resulting polymer was a hard, tough, pliable solid which was filament forming. The filaments were capable of being cold drawn to yield excellent fibers.

In the following table the results of the above examples are summarized.

| Example | Y | X |
|---|---|---|
| 1 | 30 | 60 |
| 2 | 465 | 90 |
| 3 | 350 | 10 |
| 4 | 35 | 17 |
| 5 | 89 | 80 |
| 6 | 70 | 100 |
| 7 | 70 | 100 |

In the above tabulation X represents the average number of caprolactam units in a branch chain, while Y represents the average number of acid radicals per multi-functional reactant molecule.

In the preceding examples the melt viscosities were determined by the method described in Journal of the American Chemical Society, vol. 62, p. 1057 (1940).

The multi-chain polymers herein described are polyamides prepared by the inter-reaction of a polymeric acid or derivative thereof. Other types of multi-chain polymers having very similar or identical properties may be prepared by the use of other reagents as follows:

Polyamino compounds having more than two reactive amino groups may be reacted with amino acids, or suitable derivative thereof to form a wide variety of polymers which are non-linear in nature and yet are useful in drawing synthetic fibers by reason of the absence of a network structure.

Another type of polymer may be prepared from the polyacids having more than two reactive carboxylic acid groups, or the derivatives of the same polyacids, by interreaction with hydroxy acids or the corresponding esters, or lactones.

Still other polyamide resins may be prepared by reacting polyamino compounds having three or more reactive amino groups with monohydroxy monocarboxylic acids, or the corresponding esters or lactones.

Still other multi-chain polymers may be prepared by reacting polyalcohols having three or more reactive hydroxy groups with hydroxy acids or the corresponding esters, amides and lactones.

The new compounds described in the preceding five paragraphs are prepared by methods analogous to the methods described for the preparation of resins in the example of this specification.

Although the invention has been described with respect to specific embodiments thereof, it is not intended that the details thereof shall be construed as limitations upon the scope of the invention except to the extent incorporated in the following claims.

I claim:

1. The method of preparing an amide condensation polymer which comprises condensing a compound of the group consisting of amino acids having a single primary amino group and a single carboxylic acid group separated by more than four atoms, said amino acids being free from other reactive substituents and the corresponding esters, amides, and lactams of said amino acids, with a compound of the group consisting of polymeric carboxylic acids containing an average of 10 to 500 carboxyl radicals per molecule and being free from other reactive substituents and the corresponding esters, amides, and acid chlorides of said carboxylic acids, said amino acids being present in the proportion of from 500 to 20,000 molecules for each molecule of the polycarboxylic acid.

2. The method of preparing an amide condensation polymer which comprises condensing a compound of the group consisting of amino acids having a single primary amino group and a single carboxylic acid group separated by more than four atoms, said amino acids being free from other reactive substituents and the corresponding esters, amides, and lactams of said amino acids, with a compound of the group consisting of polymeric carboxylic acids containing an average of 10 to 500 carboxyl radicals per molecule and being free from other reactive substituents, and the corresponding esters, amides, and acid chlorides of said carboxylic acids, said amino acids being present in the proportion of from 300 to 30,000 molecules for each molecule of the polycarboxylic acid.

3. The condensation polymer prepared by condensing a compound of the group consisting of amino acids having a single primary amino group and a single carboxylic acid group separated by more than four carbon atoms, said amino acids being free from other reactive substituents and the esters, amides, and lactams corresponding to said amino acids, with a compound of the group consisting of polymeric carboxylic acids containing an average of 10 to 500 carboxyl radicals per molecule and being free from other reactive substituents, and the esters, amides and acid chlorides corresponding to said carboxylic acids, said amino acids being present in the proportion of from 500 to 20,000 molecules for each molecule of the polycarboxylic acid.

4. The condensation polymer prepared by condensing a compound of the group consisting of amino acids having a single primary amino group and a single carboxylic acid group separated by more than four carbon atoms, said amino acids being free from other reactive substituents and the esters, amides, and lactams corresponding to said amino acids, with a compound of the group consisting of polymeric carboxylic acids containing an average of 10 to 500 carboxyl radicals per molecule and being free from other reactive substituents, and the esters, amides and acid chlorides corresponding to said carboxylic acids, said amino acids being present in the proportion of from 300 to 30,000 molecules for each molecule of the polycarboxylic acid.

5. The method of preparing an amide condensation polymer which comprises condensing a compound of the group consisting of amino acids having a single primary amino group and a single carboxylic acid group separated by more than four atoms, said amino acids being free from other reactive substituents, and the corresponding esters, amides, and lactams of said amino acids, with a compound of the group consisting of polymeric carboxylic acids containing an average of 25 to 200 carboxyl radicals per molecule and being free from other reactive substituents and the corresponding esters, amides, and acid chlorides of said carboxylic acids, said amino acids being present in the proportion of from 300 to 30,000 molecules for each molecule of the polymeric carboxylic compound.

6. The method of preparing an amide condensation polymer which comprises condensing a compound of the group consisting of amino acids having a single primary amino group and a single carboxylic acid group separated by more than four atoms, said amino acids being free from other reactive substituents, and the corresponding esters, amides, and lactams of said amino acids, with a compound of the group consisting of polymeric carboxylic acids containing an average of 25 to 200 carboxyl radicals per molecule and being free from other reactive substituents, and the corresponding esters, amides, and acid chlorides of said carboxylic acids, said amino acids being present in the proportion of from 500 to 20,000 molecules for each molecule of the polymeric carboxylic compound.

7. The condensation polymer prepared by condensing a compound of the group consisting of amino acids having a single primary amino group and a single carboxylic acid group separated by more than four carbon atoms, said amino acids being free from other reactive substituents and the ester, amides, and lactams corresponding to said amino acids, with a compound of the group consisting of polymeric carboxylic acids containing an average of 25 to 200 carboxyl radicals per molecule and being free from other reactive substituents, and the esters, amides and acid chlorides corresponding to said carboxylic acids, said amino acids being present in the proportion of from 300 to 30,000 molecules for each molecule of the polymeric carboxylic compound.

8. The condensation polymer prepared by condensing a compound of the group consisting of amino acids having a single primary amino group and a single carboxylic acid group separated by more than four carbon atoms, said amino acids being free from other reactive substituents, and the esters, amides, and lactams corresponding to said amino acids, with a compound of the group consisting of polymeric carboxylic acids containing an average of 25 to 200 carboxyl radicals per molecule and being free from other reactive substituents, and the esters, amides and acid chlorides corresponding to said carboxylic acids, said amino acids being present in the proportion of from 500 to 20,000 molecules for each molecule of the polymeric carboxylic compound.

9. The condensation polymer prepared by condensing a compound of the group consisting of amino acids having a single primary amino group and a single carboxylic acid group separated by more than four carbon atoms, said amino acids being free from other reactive substituents, and the esters, amides, and lactams corresponding to said amino acids, with a compound of the group consisting of polymeric carboxylic acids containing an average of 10 to 500 carboxyl radicals per molecule and being free from other reactive substituents, and the esters, amides and acid chlorides corresponding to said carboxylic acids, said condensation polymer being composed of polyamide molecules a preponderance of which exceed 40,000 in molecular weight.

10. The method of preparing an amide condensation polymer which comprises condensing a mixture of epsilon-caprolactam and polyacrylic acid containing an average of 10 to 500 carboxyl radicals per molecule, said epsilon-caprolactam being present in the proportion of from 500 to 20,000 molecules for each molecule of the polyacrylic acid.

11. The method of preparing an amide condensation polymer which comprises condensing a mixture of epsilon-caprolactam and a copolymer of acrylic acid and styrene containing an average of 10 to 500 carboxyl radicals per molecule, said epsilon-caprolactam being present in the proportion of 500 to 20,000 molecules for each molecule of the said copolymer.

12. The method of preparing an amide condensation polymer which comprises condensing a mixture of epsilon-caprolactam and polymethyl acrylate containing an average of 10 to 500 carboxylate radicals per molecule, said caprolactam being present in the proportion of from 500 to 20,000 molecules for each molecule of the polymethyl acrylate.

13. The condensation polymer prepared by condensing a compound of the group consisting of amino acids having a single primary amino group and a single carboxylic acid group separated by more than four carbon atoms, said amino acids being free from other reactive substituents, and the esters, amides, and lactams corresponding to said amino acids, with a compound of the group consisting of polymeric carboxylic acids containing an average of 10 to 500 carboxyl radicals per molecule and being free from other reactive substituents, and the esters, amides and acid chlorides corresponding to said carboxylic acids, said condensation polymer being composed of polyamide molecules a preponderance of which exceeds 10,000 in molecular weight.

14. The method of preparing an amide condensation polymer which comprises mixing (A) a compound of the group consisting of polymeric polycarboxylic acids containing an average of 25 to 200 carboxyl radicals per molecule and the esters, amides and acid chlorides thereof, wherein the polymeric chain to which the carbonyl groups are attached is composed of only hydrogen and carbon atoms and (B) a compound of the group consisting of amino acids having a hydrocarbon chain substituted with only a single primary amino group and a single carboxyl group, which groups are separated by at least five carbon atoms, and said amino acids being free from other reactive substituents, and the corresponding esters, amides and lactams thereof, said compound (B) being present in the proportion of from 300 to 30,000 molecules for each molecule of compound (A), and heating the mixture until a polymer having a molecular weight in excess of 10,000 is formed.

PAUL J. FLORY.

REFERENCES CITED

The following references are of record in the file of this patent:

UNITED STATES PATENTS

| Number | Name | Date |
|---|---|---|
| 2,241,321 | Schlack | May 6, 1941 |
| 2,303,177 | Schlack | Nov. 24, 1942 |
| 2,304,687 | Hagedorn | Dec. 8, 1942 |
| 2,341,611 | Hagedorn | Feb. 15, 1944 |

OTHER REFERENCES

Ser. No. 389,002, Hopff et al. (A. P. C.), published April 20, 1943.